Jan. 9, 1951          B. F. GEIGER          2,537,663
LINE HOLDER FOR FISHING LINE FLOATS
Filed July 27, 1948
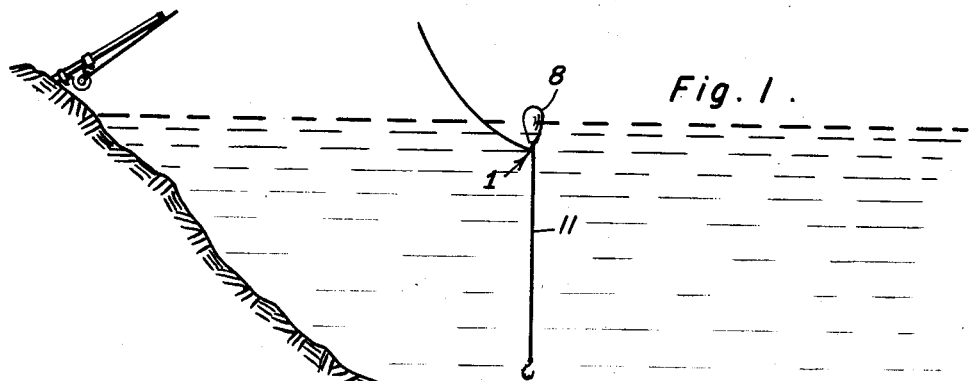
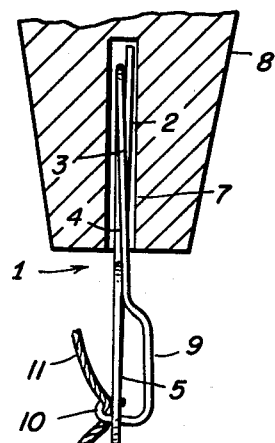
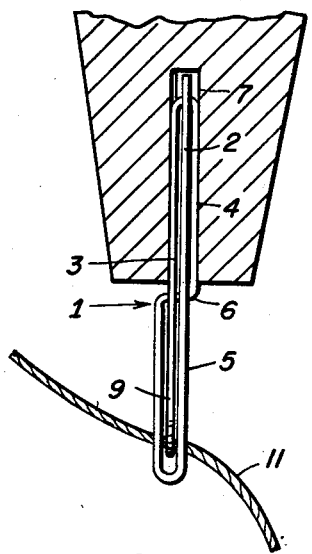
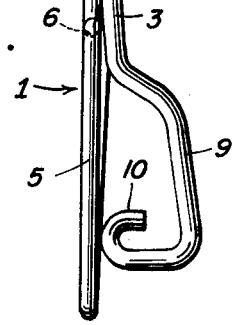
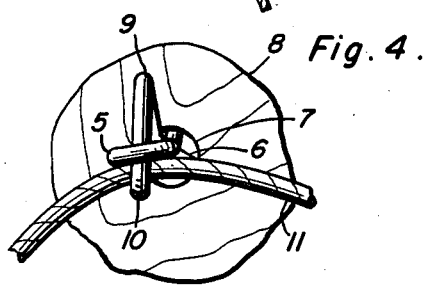
Benjamin F. Geiger
INVENTOR.

Patented Jan. 9, 1951

2,537,663

UNITED STATES PATENT OFFICE 2,537,663

LINE HOLDER FOR FISHING LINE FLOATS

Benjamin F. Geiger, Horton, Kans.

Application July 27, 1948, Serial No. 40,808

1 Claim. (Cl. 24—81)

My invention relates to improvements in line holders for attaching fishing lines to fishing line floats, or bobbers.

The primary object of my invention is to provide a simple form of inexpensive holder for attaching a fishing line to a float so as to obtain free movement of the line in varying the length of the line between the hook and float and without detaching the fishing line from the float.

Another object is to provide a holder of the type and for the purpose above set forth which is adapted for quick easy operation by thumb pressure to release the line for free running through the holder for adjustment of the line relative to the float and which is adapted to frictionally grip the line in a manner to hold the same fast without fraying, or otherwise weakening the line at the holding point.

Other and subordinate objects, within the purview of my invention, together with the precise nature of my improvements will be readily understood when the succeeding description and claim are read with reference to the drawing accompanying and forming part of this specification.

In said drawing:

Figure 1 is a view illustrating a fishing line attached to the line float by means of my improved line holder in a preferred embodiment thereof;

Figure 2 is a fragmentary view partly in longitudinal section and partly in side elevation of the float with my improved holder drawn to a larger scale and illustrating the manner in which the fishing line is gripped between the line gripping loop and the line gripping hook;

Figure 3 is a similar view with the float and holder turned through an angle of 90 degrees;

Figure 4 is a view in end elevation of the same drawn to a still larger scale;

Figure 5 is a fragmentary view partly in longitudinal section and partly in side elevation illustrating how the line gripping hook is withdrawn out of the line gripping loop by reaction of the movable leg of the holder, the parts being drawn to the same scale as in Figure 4.

Referring to the drawing by numerals, my improved line holder, as shown therein, comprises an elongated member 1 of bent resilient wire, comprising a pair of relatively fixed and movable legs 2, 3 extending substantially side by side oppositely from opposite ends of the member 1 and forming relatively opposite sides of a pair of elongated, substantially co-extensive, attaching and line gripping loops 4, 5 of which said legs 2, 3 form one side thereof.

The other relatively opposite sides of said loops 4, 5 are connected by a cross portion 6 of said member 1.

The relatively fixed leg 2 extends alongside the attaching loop 4 and past the same and together with said attaching loop 4 is adapted to be inserted partway in the usual end bore 7 of the fishing line float 8, said leg and loop expanding in said bore to frictionally fit therein and so that the line gripping loop 5 extends out of the bore. As will be clear, the attaching loop 4 is adapted to be compressed for reaction against the wall of said bore 7 to further grip the same.

The movable leg 3 is formed with a laterally offset, free end, thumb pressure portion 9 having a terminal inturned line gripping hook 10 thereon adapted to be extended through the line gripping loop 5, and to be normally withdrawn out of said loop 5 by reaction of the movable leg 3.

To attach the fishing line 11 to the float 8 by means of the described holder, it is merely necessary to grasp the float 8 in the hand and with the thumb of the hand press against the thumb pressure portion 9 of the movable leg 3 to extend the line gripping hook through said loop 5 sufficiently to enter said line 11 in said hook 10, and to then release said portion 9 to permit the movable leg 3 to react and tend to withdraw said hook 10 out of said loop 5. Under reaction of the movable leg 3 the fishing line 11 will be frictionally gripped between and by the line gripping loop 5 and the line gripping hook 10 as best shown in Figures 2, 3 and 4. Slight thumb pressure exerted against the thumb pressure portion 9 will result in loosening the grip on the fishing line so that the same may be pulled freely through the line gripping hook 10 to adjust said line and without detaching the same. As best shown in Figure 5, the movable leg 3 normally bears against the cross portion 6 of the member 1 so that pressure against the thumb pressure portion 9 to extend the line gripping hook 10 through the line gripping loop 5 is strongly opposed. This results in reaction of the thumb pressure portion 9 and said hook 10 to tightly grip the fishing line 11 between said loop 5 and hook 10.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described the invention, what is claimed as new is:

A line holder for attaching a fishing line to a float having a bore, said holder comprising an elongated member of bent resilient wire including a pair of relatively fixed and movable legs extending oppositely from opposite ends of said member, a pair of elongated attaching and line gripping loops of which said legs form relatively opposite sides, the attaching loop and relatively fixed leg being adapted for insertion in said bore with an expanding friction fit to grip the wall of the bore, the movable leg terminating in a line gripping hook movable through said line gripping loop under pressure against said movable leg to hook over said line, said movable leg being reactive to cause said hook and line gripping loop to grip the line therebetween, said member having a cross portion for engagement with said movable leg adjacent said hook to cause said leg to react in a manner to effect a tight grip on said line by said hook and line gripping loop.

BENJAMIN F. GEIGER.

REFERENCES CITED

The following references are of record in the file of this patent:

UNITED STATES PATENTS

| Number | Name | Date |
| --- | --- | --- |
| 415,184 | Barlow | Nov. 19, 1889 |
| 582,788 | Huebner | May 18, 1897 |
| 1,301,745 | Reynolds | Apr. 22, 1919 |
| 1,441,230 | Legge | Jan. 9, 1923 |
| 1,489,306 | Casady | Apr. 8, 1924 |
| 1,844,652 | Harley | Feb. 9, 1932 |